United States Patent
Graves (10) Patent No.: US 7,817,583 B2
(45) Date of Patent: Oct. 19, 2010

(54) METHOD FOR VERIFYING A STORAGE AREA NETWORK CONFIGURATION

(75) Inventor: David A. Graves, Monte Serreno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1884 days.

(21) Appl. No.: 10/425,690

(22) Filed: Apr. 28, 2003

(65) Prior Publication Data

US 2004/0228290 A1 Nov. 18, 2004

(51) Int. Cl.
*H04L 12/28* (2006.01)

(52) U.S. Cl. .................. 370/257; 370/254; 370/255; 370/351; 370/389; 370/408

(58) Field of Classification Search ................. 370/254, 370/351, 389, 408, 255, 352; 709/217, 223
See application file for complete search history.

(56) References Cited

U.S. PATENT DOCUMENTS

| | | | | |
|---|---|---|---|---|
| 5,838,907 A * | 11/1998 | Hansen | ........................ | 709/220 |
| 6,148,414 A * | 11/2000 | Brown et al. | ................... | 714/9 |
| 6,252,858 B1 * | 6/2001 | Inoue | ........................ | 370/254 |
| 6,343,324 B1 * | 1/2002 | Hubis et al. | ................. | 709/229 |
| 6,446,141 B1 * | 9/2002 | Nolan et al. | ................... | 710/8 |
| 6,553,408 B1 * | 4/2003 | Merrell et al. | ............... | 709/213 |
| 6,640,278 B1 * | 10/2003 | Nolan et al. | .................... | 711/6 |
| 6,785,742 B1 * | 8/2004 | Teow et al. | ..................... | 710/1 |
| 6,839,750 B1 * | 1/2005 | Bauer et al. | ................. | 709/223 |
| 6,845,387 B1 * | 1/2005 | Prestas et al. | ............... | 709/203 |
| 6,959,337 B2 * | 10/2005 | McLaughlin et al. | ........ | 709/229 |
| 6,977,927 B1 * | 12/2005 | Bates et al. | ................. | 370/381 |
| 6,978,301 B2 * | 12/2005 | Tindal | ........................ | 709/223 |
| 6,993,023 B2 * | 1/2006 | Foster et al. | ................. | 370/389 |
| 6,996,058 B2 * | 2/2006 | Foster et al. | ................. | 370/228 |
| 7,003,562 B2 * | 2/2006 | Mayer | ......................... | 709/223 |
| 7,051,121 B2 * | 5/2006 | Ohno et al. | .................... | 710/5 |
| 7,058,702 B2 * | 6/2006 | Hogan | ......................... | 709/220 |
| 7,065,563 B2 * | 6/2006 | Islam et al. | ................. | 709/220 |
| 7,103,653 B2 * | 9/2006 | Iwatani | ........................ | 709/223 |
| 7,185,079 B1 * | 2/2007 | Bainbridge et al. | ......... | 709/223 |
| 7,197,489 B1 * | 3/2007 | Gauvin et al. | .................. | 707/1 |
| 7,222,167 B2 * | 5/2007 | Asaka et al. | ................. | 709/223 |
| 7,272,848 B1 * | 9/2007 | Meyer et al. | .................... | 726/1 |
| 7,349,961 B2 * | 3/2008 | Yamamoto | ................... | 709/224 |
| 7,376,898 B1 * | 5/2008 | Yehuda et al. | .............. | 715/741 |
| 7,382,776 B1 * | 6/2008 | Chan et al. | ................... | 370/389 |
| 7,404,000 B2 * | 7/2008 | Lolayekar et al. | ........... | 709/230 |
| 2002/0103889 A1 * | 8/2002 | Markson et al. | ............. | 709/223 |
| 2002/0103943 A1 * | 8/2002 | Lo et al. | ......................... | 710/2 |
| 2002/0161596 A1 * | 10/2002 | Johnson et al. | ................ | 705/1 |
| 2002/0196744 A1 * | 12/2002 | O'Connor | .................... | 370/254 |
| 2003/0053448 A1 * | 3/2003 | Craig et al. | .................. | 370/353 |
| 2003/0055932 A1 * | 3/2003 | Brisse | ......................... | 709/223 |
| 2003/0237017 A1 * | 12/2003 | Jibbe | .............................. | 714/4 |
| 2004/0006612 A1 * | 1/2004 | Jibbe et al. | .................. | 709/223 |
| 2004/0030771 A1 * | 2/2004 | Strassner | .................... | 709/224 |

(Continued)

Primary Examiner—Ayaz R Sheikh
Assistant Examiner—Andrew C Lee (57) ABSTRACT

In one embodiment, a map describing a correct configuration attribute for communicatively coupling a storage area network device with another device is accessed. An actual configuration attribute of the storage area network device is requested. The actual configuration attribute of the storage area network device is then compared to the correct configuration of the storage area network device and a result is generated in response to the comparing.

23 Claims, 6 Drawing Sheets

U.S. PATENT DOCUMENTS

| | | |
|---|---|---|
| 2004/0068561 A1* | 4/2004 | Yamamoto et al. .......... 709/224 |
| 2004/0128341 A1* | 7/2004 | Synek et al. ................ 709/200 |
| 2005/0055428 A1* | 3/2005 | Terai et al. ................. 709/220 |
| 2006/0026263 A1* | 2/2006 | Raghavan et al. ........... 709/217 |
| 2008/0059613 A1* | 3/2008 | Strassner ................... 709/220 |

\* cited by examiner

METHOD FOR VERIFYING A STORAGE AREA NETWORK CONFIGURATION

TECHNICAL FIELD

Embodiments of the present invention relate to the verification of computing resources. More specifically, embodiments of the present invention are directed to verifying storage area network configuration.

BACKGROUND ART

Modern networking continues to provide an improvement in communication and information access. As an example, in-house data centers, associated with a particular entity or interrelated group of users, could contain a large number of information technology (IT) resources that are interconnected through a network. The resources in the in-house data centers are managed by network administrators. Because a data center may comprise hundreds or thousands of servers coupled with multiple disk storage arrays, each of which may contain hundreds of disk drives, managing and verifying the cable connections between servers and allocated storage resources within a data center is becoming increasingly complicated.

One such resource that is increasingly used in large enterprise network environments is a storage area network (SAN). A SAN is a dedicated network that couples an enterprise's storage devices with servers and manages them as a single resource rather than a collection of discreet storage devices. Because a SAN typically acts independently from the enterprise local area (LAN) network or wide area network (WAN), network performance is improved.

Figure 1:
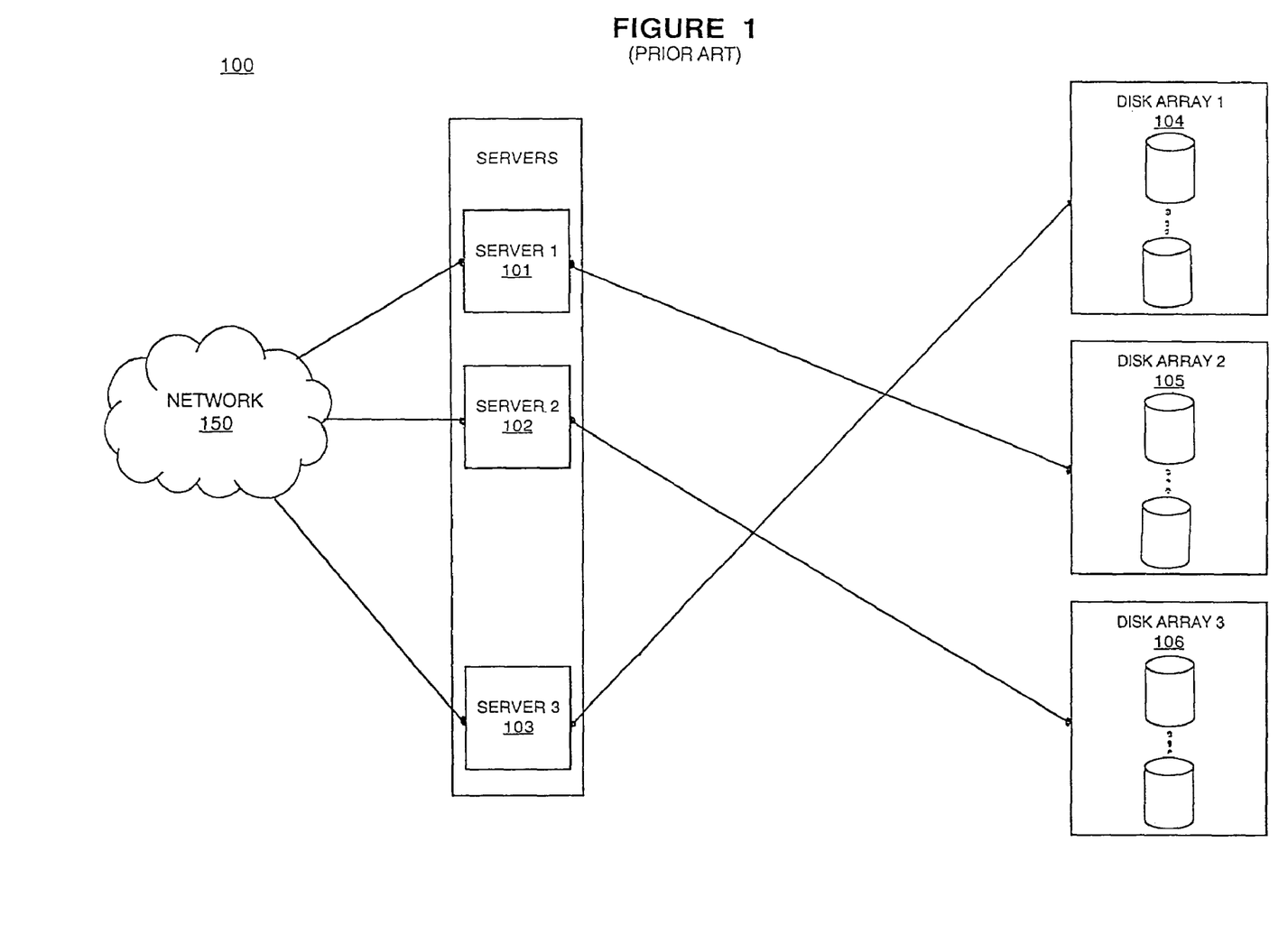
FIG. 1 is a block diagram of an exemplary prior art method for coupling computer resources in a storage area network.

In the past, a manual process was implemented by a network administrator to reconfigure the network cabling to couple a particular user or group of users to their allotted storage resources in an in-house data center. FIG. 1 shows an exemplary prior art network 100 that utilizes manual configuration of resources. In FIG. 1, a plurality of servers (e.g., servers 101, 102, and 103) are directly coupled with a plurality of disk arrays (e.g., disk arrays 104, 105, and 106) using individual data lines. The servers are also coupled with a network 150 which may be an enterprise backbone or the Internet. It is appreciated that an enterprise network such as network 100 may actually comprise hundreds or thousands of servers that are coupled with hundreds or thousands of drive arrays. Additionally, each drive array may comprise hundreds of individual disk drives.

A map of the network showing the network cabling that communicatively couples the servers with the disk arrays is typically created by hand. The connections between servers and disk arrays must be manually disconnected and reconnected when network resources are re-allocated. For example, if a given project required the allocation of 20 servers and 20 disk arrays, a manual reconfiguration of the network may be necessitated. However, the process of visually inspecting a map of the network to determine what resources are available for reconfiguration is considered tedious by many network administrators and is prone to human error. Additionally, in large enterprise networks, the size of the network itself precludes accurately allocating network resources based upon a visual inspection of a network map. Finally, the network map cannot detect discrepancies between the network configuration described by the map and the actual network configuration. This can result in misallocation of network resources such as making sensitive information available to unauthorized users.

Automated processes have been implemented in the prior art for the retrieval of configuration attributes for computing resources in an in-house data center. This automated process can be used for determining what computing resources are available and their status in each of the IT environments of the in-house data center. Automation of this process is particularly useful for keeping track of computing resources since each of the IT environments within the in-house data center are constantly changing with respect to the physical locations of computing resources and their use.

However, in the prior art, the automation of discovering configuration attributes for computing resources in an in-house data center was limited to discovery only. The network administrator would necessarily manually check to see if the proper computing resources, and their corresponding configuration attributes, were allocated to the correct IT environment. In other words, the network administrator must manually determine, in the prior art, whether the IT environments were configured correctly with the right computing resources to meet the IT environment's objectives and resource requests. This verification of computing resources through their attributes can be a complex and tedious process when manually performed by a network administrator especially with larger numbers of computing resources in each of IT environments in the in-house data center.

Figure 2:
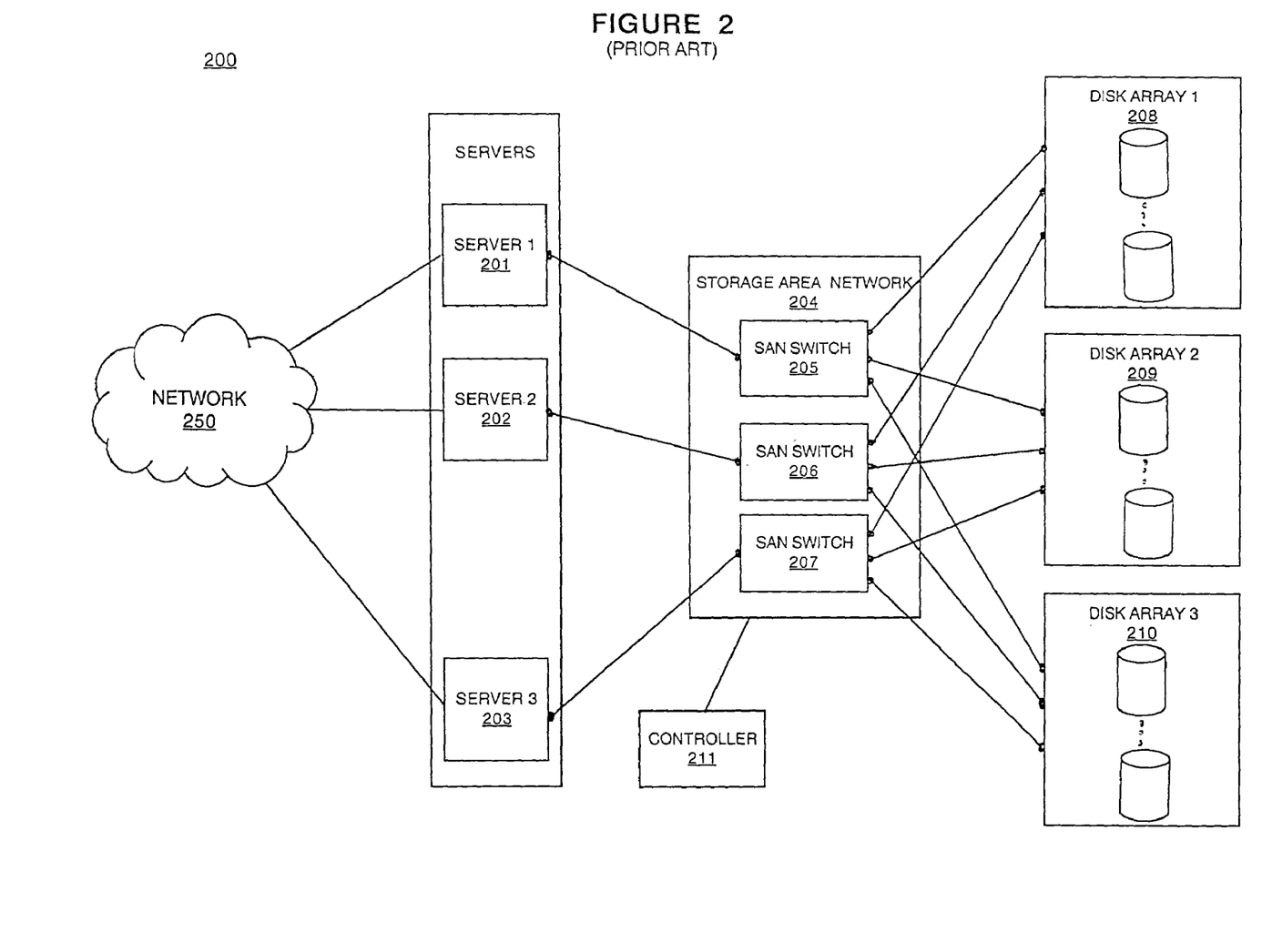
FIG. 2 is a block diagram of an exemplary prior art method for coupling computer resources in a switched storage area network.

FIG. 2 shows an exemplary network 200 that utilizes a SAN 104 to transfer data between servers (e.g., servers 201, 202, and 203) with disk arrays (e.g., disk arrays 208, 209, and 210) using SAN switches (e.g., switches 205, 206, and 207). SAN 204 provides a communications infrastructure and management utilities that organize connections, storage elements, and computer systems so that data transfer is more secure and reliable. The servers are further coupled with a network 250 such as an enterprise backbone or the Internet. Using controller 211 and map 260, a network administrator can send programming logic to the SAN switches to logically allocate resources in the network. For example, server 202 is physically coupled with SAN switch 206 which is physically coupled with disk arrays 208, 209, and 210. However, using controller 211, a network administrator may send programming logic to SAN switch 206 that prevents server 202 from accessing data stored upon disk array 208 and 210. An administrator may also assign a specific group of disk drives on a disk array to a particular server.

In the example, of FIG. 2, a network map is created by a software program that queries SAN switches 208, 209, and 210 to determine what devices they can sense at each of their ports and outputs a map of the network. Each time a change in the physical topography of the network is changed, a new map of the network is created using the software program. For example, as a result of a query SAN switch 207 may return data indicating that server 3 is coupled with one port and disk arrays 208, 209, and 210 are coupled with other respective ports. While this map is typically more accurate than the network map of FIG. 1, reading and interpreting all of the connection attributes of the network is still done by a network administrator and is just as prone to human error.

Additionally, because the map is limited to discovery of current network allocation, it does not address whether the current allocation of resources is in accordance with the network configuration desired by the administrator. While the software program can adequately detect major faults such as missing or broken hardware, more subtle faults, such as cables plugged into the wrong ports, are not as easily detected. For example, a data cable that should be plugged into port 1 of SAN switch 207 may be plugged into port 2 by mistake. While the software may detect that data is being sent successfully, it is not being sent to the correct destinations. Again, this may cause sensitive data to be accessed by unauthorized users.

Thus, in the prior art, determining the configuration of a storage area network is a complex and tedious task, especially in larger enterprise networks. Additionally, the process is prone to human error and does not readily detect subtle errors in the actual network configuration.

DISCLOSURE OF THE INVENTION

A method for verifying a storage area network configuration. In one embodiment, a map describing a correct configuration attribute for communicatively coupling a storage area network device with another device is accessed. An actual configuration attribute of the storage area network device is requested. The actual configuration attribute of the storage area network device is then compared to the correct configuration of the storage area network device and a result is generated in response to the comparing.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

Prior Art

Prior Art

MODES FOR CARRYING OUT THE INVENTION

Reference will now be made in detail to embodiments of the present invention, a method and system for verifying configuration attributes of computing resources in a data center, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "including," "receiving," or "contacting," or "requesting," or "determining," or "comparing," or "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 3:
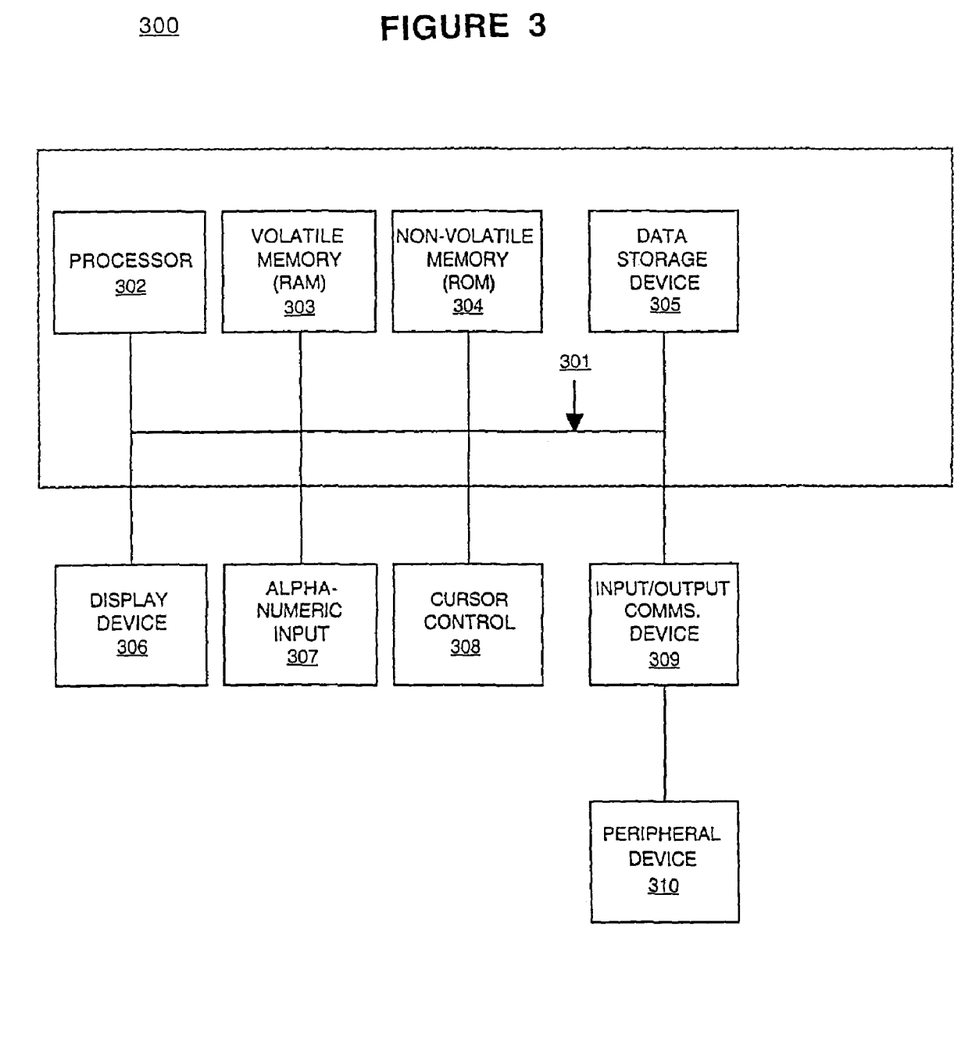
FIG. 3 is a block diagram of an exemplary computer system upon which embodiments of the present invention may be utilized.

With reference to FIG. 3, portions of the present invention are comprised of computer-readable and computer-executable instructions that reside, for example, in computer system 300 which is used as a part of a general purpose computer network (not shown). It is appreciated that computer system 300 of FIG. 3 is exemplary only and that the present invention can operate within a number of different computer systems including general-purpose computer systems, embedded computer systems, laptop computer systems, hand-held computer systems, and stand-alone computer systems.

In the present embodiment, computer system 300 includes an address/data bus 301 for conveying digital information between the various components, a central processor unit (CPU) 302 for processing the digital information and instructions, a volatile main memory 303 comprised of volatile random access memory (RAM) for storing the digital information and instructions, and a non-volatile read only memory (ROM) 304 for storing information and instructions of a more permanent nature. In addition, computer system 300 may also include a data storage device 305 (e.g., a magnetic, optical, floppy, or tape drive or the like) for storing vast amounts of data. It should be noted that the software program for performing verification of Storage Area Network configuration of the present invention can be stored either in volatile memory 303, data storage device 305, or in an external storage device (not shown).

Devices which are optionally coupled to computer system 300 include a display device 306 for displaying information to a computer user, an alpha-numeric input device 307 (e.g., a keyboard), and a cursor control device 308 (e.g., mouse, trackball, light pen, etc.) for inputting data, selections, updates, etc. Computer system 300 can also include a mechanism for emitting an audible signal (not shown).

Returning still to FIG. 3, optional display device 306 of FIG. 3 may be a liquid crystal device, cathode ray tube, or other display device suitable for creating graphic images and alpha-numeric characters recognizable to a user. Optional cursor control device 308 allows the computer user to dynamically signal the two dimensional movement of a visible symbol (cursor) on a display screen of display device 306. Many implementations of cursor control device 308 are known in the art including a trackball, mouse, touch pad, joystick, or special keys on alpha-numeric input 307 capable of signaling movement of a given direction or manner displacement. Alternatively, it will be appreciated that a cursor can be directed an/or activated via input from alpha-numeric input 307 using special keys and key sequence commands. Alternatively, the cursor may be directed and/or activated via input from a number of specially adapted cursor directing devices.

Furthermore, computer system 300 can include an input/output (I/O) signal unit (e.g., interface) 309 for interfacing with a peripheral device 310 (e.g., a computer network, modem, mass storage device, etc.). Accordingly, computer system 300 may be coupled in a network, such as a client/server environment, whereby a number of clients (e.g., personal computers, workstations, portable computers, minicomputers, terminals, etc.) are used to run processes for performing desired tasks (e.g., "accessing," "including," "receiving," or "contacting," or "requesting," or "determining," or "comparing," or "generating,", etc.). In particular, computer system 300 can be coupled in a system for verifying the configuration of a Storage Area Network.

Figure 4:
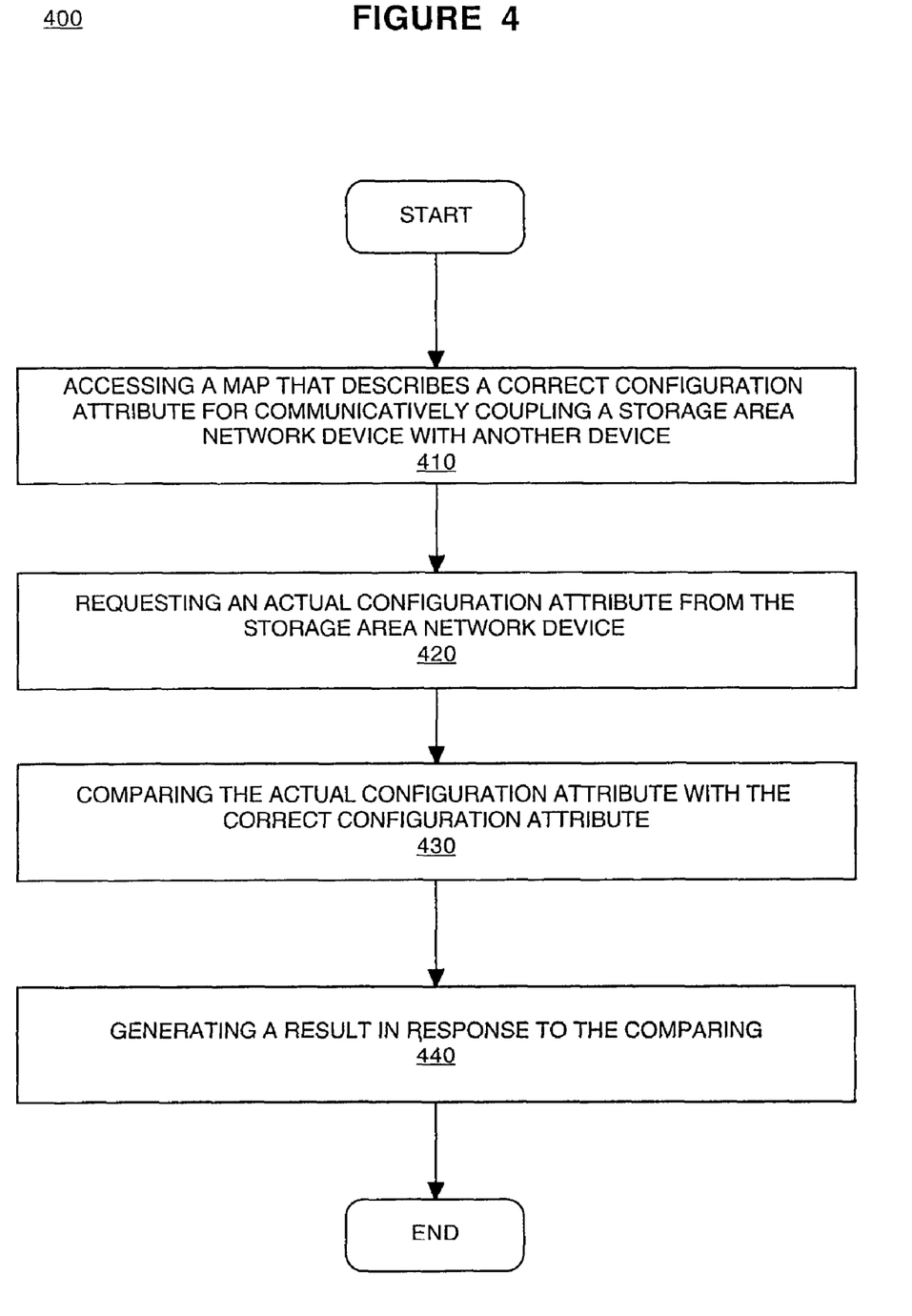
FIG. 4 is a flowchart of a method for verifying a storage area network configuration in accordance with embodiments of the present invention.

FIG. 4 is a flowchart 400 of a method for verifying a storage area network configuration is compliance with one embodiment of the present invention. For purposes of clarity, the following discussion will utilize the block diagram of FIG. 5 in conjunction with flowchart 400 of FIG. 4, to clearly describe one embodiment of the present invention. In step 410 of FIG. 4, a map is accessed that describes a correct configuration attribute for communicatively coupling a storage area network device with another device.

Figure 5:
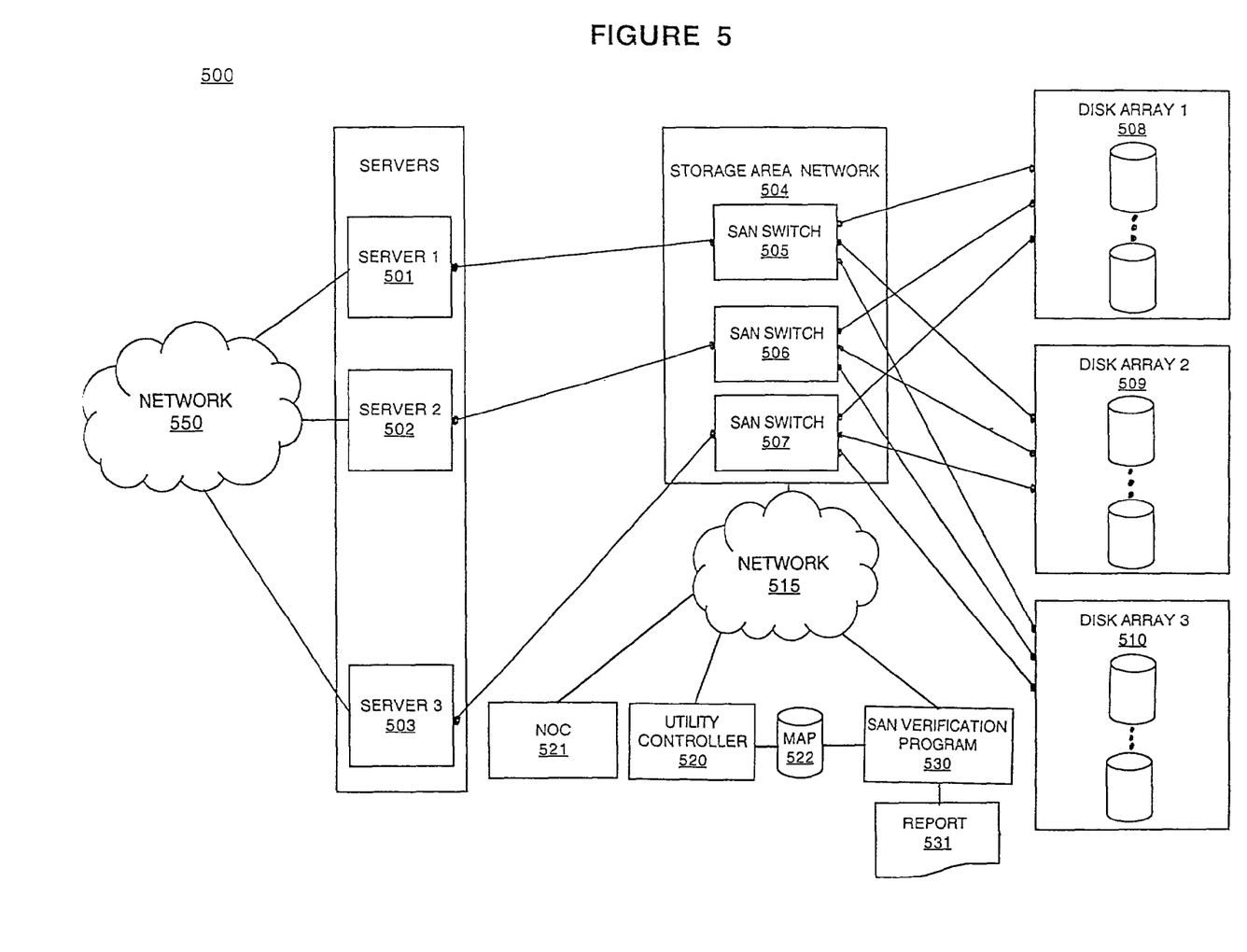
FIG. 5 is a block diagram of a storage area network configuration in accordance with embodiments of the present invention.

FIG. 5, is a block diagram of a utility data center (UDC) 500 that utilizes a method for verifying a storage area network configuration in accordance with embodiments of the present invention. In FIG. 5, a plurality of servers (e.g., servers 501, 502, and 503) are coupled with a plurality of disk arrays (e.g., disk arrays 508, 509, and 510) via storage area network (SAN) 504. More specifically, SAN 504 comprises a plurality of SAN switches (e.g., SAN switches 505, 506, and 507) that communicatively couple servers 501, 502, and 503 with disk arrays 508, 509, and 510. As stated above, each of the disk arrays may be comprised of hundreds or thousands of individual disk drives. Servers 501, 502, and 503 are further coupled with network 550 which is, for example, an enterprise backbone, or the Internet. UDC 500 is capable of verifying configuration attributes of its computing resources such as SAN 504. However, while the present embodiment recites verifying the configuration of a storage area network specifically, embodiments of the present invention are also well suited to verification of other configuration attributes of other resources in UDC 500.

UDC 500 further comprises a network operations center (NOC) 521 and a utility controller 520 that are coupled with SAN 504 via a network 515. The NOC 521 provides for overall control over the UDC 500. In one embodiment, the NOC 521 is manned by network technicians that monitor the management and allocation of computing resources in the UDC 500. The network technicians also provide for the installation and repair of physical resources in the pool of computing resources. Also, the NOC 521 acts as an interface between the UDC 500 and a plurality of end users. The NOC 521 can be coupled to the plurality of end users through the network 550.

The utility controller 520 manages the computing resources in the UDC 500. For example, the utility controller 520 enables the deployment, allocation, and management of computing and storage resources. One method for allocating resources in UDC 500 is the creation of "farms." Farms are logical assemblies of computing and appliance resources that are virtually coupled and managed by the utility controller software to implement solution designs. The utility controller 520 monitors deployed farms, and automatically re-deploys replacement resources if any failures in computing resources are detected. The farms deployed with computing resources can be tailored to meet a wide variety of services. Each farm has its own dedicated computing, storage, and appliance resources. The farms can share common resources, such as storage and networking fabric, or can be managed as a plurality of networked farms within a larger enterprise network. In addition, the utility controller 520 monitors shared infrastructure resources, alerting the NOC 521 of failures or other significant events, such as, intrusion attempts.

In one embodiment, UDC 500 utilizes a programmable infrastructure that enables the virtual connection of any computing resource as well as the isolation of a set of computing resources, thereby ensuring the security and segregation of computing resources at the lowest infrastructure level. The pool of computing resources in the UDC 500 is comprised of a pre-wired, pre-integrated, and pre-tested plurality of physical resources from which multiple farms can be created on demand. The computing resources include, but are not limited to, the following: servers, switches, computers, appliances (e.g., load balancers and firewalls), storage arrays, and backup devices. More specifically, in FIG. 5 SAN 504 may comprise a plurality of SCSI-to-fibre converters, fibre channel hubs, fibre channel switches and fibre channel bridges. The computing resources in the UDC 500 are physically pre-wired, pre-tested, and integrated (ideally a one-time wiring solution) and then dynamically, and logically re-wired into various virtual farm environments. The computing resources can be logically re-wired using virtual local area network technology (VLAN), in one embodiment. As such, the UDC 500 can create and manage a plurality of virtual farms, each of which utilize a set of computing resources in the UDC 500, or a plurality of networked farms within a larger enterprise network.

In another embodiment, the UDC 500 supports multi-vendor and open system support for the plurality of computing resources. As such, the UDC 500 can provide support to computing resources that have the same functionality (e.g., firewalls) but are provided by different vendors. Also, the UDC 500 can support the various operating systems that each of those computing resources may use.

The UDC 500 is further comprised of a SAN verification program 530 that is coupled to a network map 522. The SAN verification program 530 is coupled to network 515, as shown in FIG. 5, that is internal to the UDC 500 to provide communicable coupling with the pool of computing resources (e.g., servers 501, 502, and 503, SAN 504, and disk arrays 508, 509, and 510).

The network map 522 is a machine-readable network map. The network map 522 contains information pertaining to each of the computing resources in the UDC 500. Specifically, the information contained within the network map includes configuration attributes. The configuration attributes provide device specific information necessary for determining how the specific computing resource can fulfill a farm objective, and how compatible that device is coupled with other computing resources tasks to fulfill a common farm objective.

In one case, the configuration attributes that are associated with the computing devices in a UDC are impermanent, and completely updateable or capable of being changed. For example, software applications and/or firmware are loaded onto a particular computing resource and can be changed or updated according to the needs of a user.

In another case, the configuration attributes that are associated with the computing devices in a UDC are permanent and are not capable of being changed. For example, permanent configuration attributes for a particular computing resource include, but are not limited to the following: the manufacturer, the model, how many ports are included in the computing resource, serial number, network address, etc.

Additionally, network map 522 is regarded as a "correct" representation of UDC 500 that describes its valid configuration attributes. As described above, the computing resources in the UDC 500 are physically pre-wired, pre-tested, and integrated in accordance with network map 522. In conventional computer networks, the network map typically is created based upon discovery of the actual configuration attributes of the network after the network has been built. Frequently, this actual configuration is not in accordance with the network configuration that is desired by the network administrator. In embodiments of the present invention, the map drives the creation of the UDC 500. Thus, when a configuration attribute is identified that is not in accordance with the network map 522, corrective action is taken to bring it into accordance with the corresponding correct configuration attribute described in the map.

The configuration attributes contained within the network map 522 and associated with each of the computing devices in UDC 500 discloses the type of device the computing resource is in one embodiment. This may include, but is not limited to, the following: SCSI-to-fibre converters, fibre channel switches, hubs, and bridges, computers, load balancers, and firewalls, disk arrays, backup devices, etc. Furthermore, other device specific representations of configuration attributes may include, but are not limited to the following: name, device make, model, serial number, MAC addresses, software version, and firmware version, etc.

In one embodiment, a database of world wide name (WWN) addresses of the devices coupled in SAN 504 is also maintained in map 522. A WWN is a 64 or 128 bit worldwide unique name based upon a company's IEEE identifier and a vendor unique serial number. WWNs are used to identify each of the devices or device ports coupled in SAN 504. For example, a separate WWN is associated with each of the servers (e.g., servers 501, 502, and 503), SAN switches 505, 506, and 507, and disk arrays 508, 509, and 510. Additionally, each of the disk drives in a disk array may also be assigned its own WWN. The WWN is frequently used to issue commands to the disk arrays and individual disks drives in a storage area network. In one embodiment, the source and destination of each SAN fabric cable, including the port ID for the source and destination devices that the cable couples, is described in network map 522. While the present embodiment recites the use of WWNs to identify configuration attributes in UDC 500, the present invention is well suited to utilize other methods as well.

The SAN verification program 530 performs the validation or verification of the configuration attributes of each of the computing resources in the pool of computing resources of a particular UDC. In one embodiment, the SAN verification program 530 performs the validation or verification automatically.

Referring again to step 410 of FIG. 4, network map 522 is accessed to determine a correct configuration attribute for communicatively coupling a storage area network device with another device. For example, SAN verification program 530 obtains the correct configuration attributes for communicatively coupling storage area network 504 from network map 522.

With reference to FIG. 5, and to step 420 of FIG. 4, an actual configuration attribute from the storage area network device is requested. In one embodiment, the actual configuration attribute comprises a port identifier and the identity of a network device coupled with that port. For example, a query is sent to SAN switch 506 to access the WWN-to-port table for SAN switch 506. The WWN-to-port table lists each communication port for the SAN switch 506. It also lists the WWNs that SAN switch 506 detects at each particular port. Thus, the WWN-to-port table may indicate that WWNs 1, 2, 3, and 4 are coupled with port 21, WWNs 5, 6, and 7 are coupled with port 22, and WWNs 8 and 9 are coupled with port 23. Referring to FIG. 5, the WWN-to-port table may indicate that disk array 508 is coupled with port 1 of SAN switch 506, that disk array 509 is coupled with port 2 of SAN switch 506, and that disk array 510 is coupled with port 3 of SAN switch 506 and that server 502 is coupled with port 4 of SAN switch 506. This information is returned to the SAN verification program 530 in one embodiment.

With reference to FIG. 5, and to step 430 of FIG. 4, the actual configuration attribute is compared with the correct configuration attribute. For each device that is expected to be directly coupled with a given SAN switch according to map 522, the WWN-to-port table is searched to find the WWN that identifies that device.

For example, SAN verification program 530 examines map 522 and determines that server 502 should be communicatively coupled with port 4 of SAN switch 506. SAN verification program 530 searches the WWN-to-port table of SAN switch 506 to determine whether the WWN that identifies server 502 is detected by SAN switch 506. If the WWN of server 502 is detected, SAN verification program 530 then examines the WWN-to-port table to determine whether server 502 is communicatively coupled with the correct port (e.g., port 4) of SAN switch 506. SAN verification program 530 continues searching the WWN-to-port table of SAN switch 506 to determine whether WWNs listed in map 522 are detected by SAN switch 506 and whether the WWNs are coupled with the correct port of SAN switch 506. It is appreciated that the WWN-to-port table may list not only the WWN for a given disk array that is coupled with a port, but also the WWNs of the individual disk drives comprising that disk array.

Referring now to FIG. 5 and to step 440 of FIG. 4, a report is generated in response to the comparing of step 430. The SAN verification program 530 generates a message report 531 that lists the results from the verification of the configuration attributes. The report 531 contains a message listing each instance where an actual configuration attribute differs from the corresponding correct configuration attribute that is listed in the map 522. In addition, the message report can list each instance where the actual configuration attribute is in accordance with the correct configuration attribute of map 522.

For example, SAN verification program 530 can generate a pass message in report 531 that states that the actual configuration attribute for port 4 of SAN switch is correct. Additionally, if a WWN that is listed in map 522 is not found, or is determined to be coupled with the wrong port of SAN switch 506, a fail message is included in report 531 that indicates the actual configuration attribute is not in accordance with the corresponding correct configuration attribute as listed in map 522.

Additionally, in one embodiment, when a fail message is generated indicating that the actual configuration attribute is not correct, information is provided that can be used to correct the error. For example, if the WWN-to-port table of SAN switch 506 shows that disk array 509 is coupled with port 3, and that disk array 510 is coupled with port 2, a fail message in report 531 indicates that the actual configuration attributes are not in accordance with their corresponding correct configuration attributes in map 522. Additionally, instructions are included in report 531 describing how to correct the detected error. In the example above, a message to switch the cables that are connected to ports 2 and 3 of SAN switch 506 is included in report 531 along with the fail message.

The present invention is advantageous over conventional methods because it can detect subtle configuration errors that previously would not generate a fail message. For example, in the prior art, gross failures such as hardware failure, cut or pinched communication cables, etc, are easily detected. However, a subtle error such as two communication cables that are connected to the wrong ports may not be detected because data can still be exchanged over the switched cables. In other words, the network connections are functional, but do not direct data in the manner specified by the network map. This can create a serious flaw in network security as sensitive information may become available to unauthorized users. Additionally, prior art solutions were limited to discovery only and did not provide instructions for correcting discrepancies between actual configuration attributes and the correct configuration attributes listed in the network map. This facilitates detecting and correcting the error more quickly that prior art solutions. Embodiments of the present invention can be used to verify the initial installation of a network (e.g., UDC 500) and to verify additional installations and repairs of network devices in the network.

Figure 6:
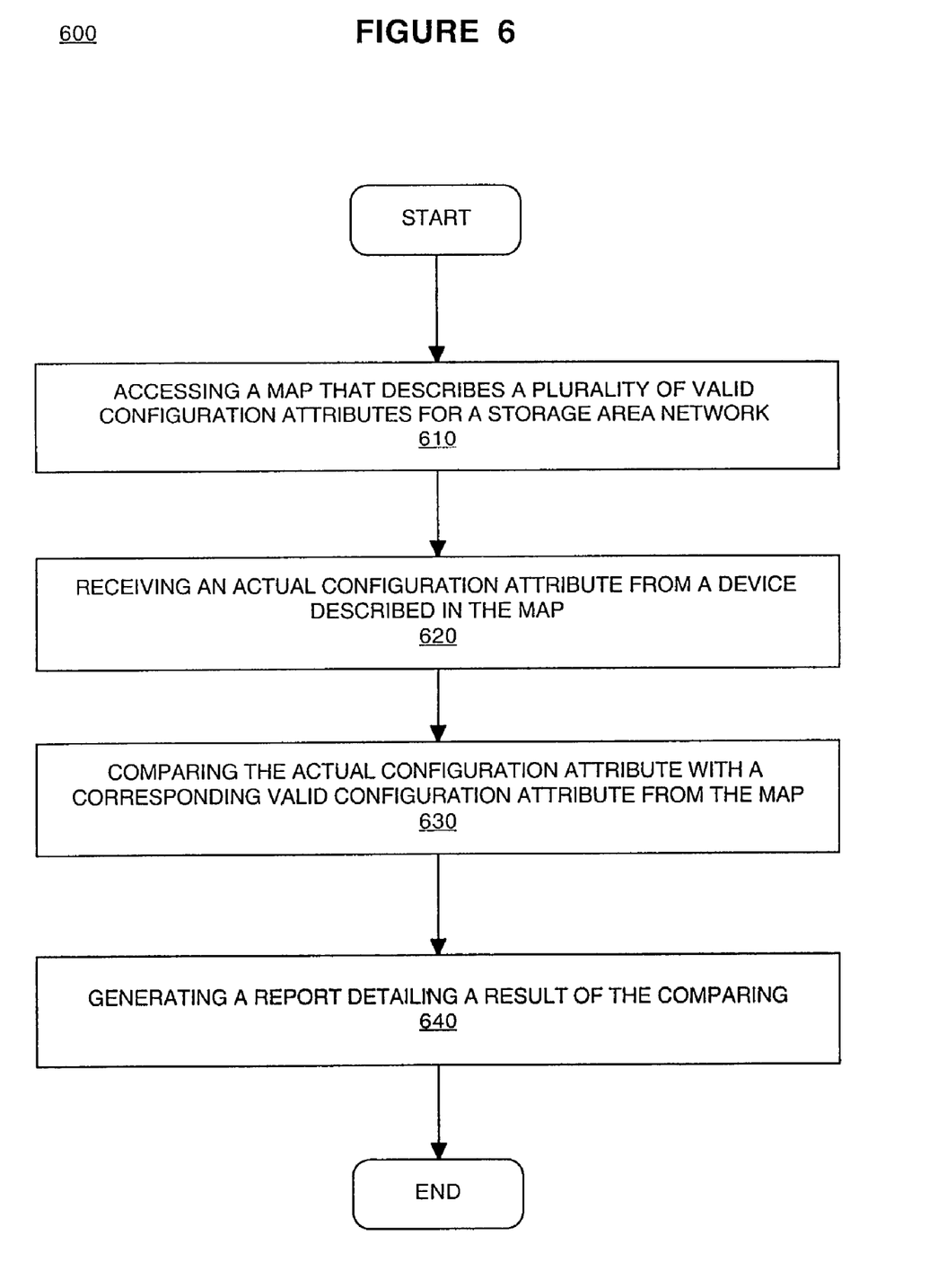
FIG. 6 is a flowchart of a method for verifying a storage area network configuration in accordance with another embodiment of the present invention.

FIG. 6 is a flowchart 600 of a method for verifying a storage area network configuration is compliance with one embodiment of the present invention. For purposes of clarity, the following discussion will utilize the block diagram of FIG. 5 in conjunction with flowchart 600 of FIG. 6, to clearly describe one embodiment of the present invention. In step 610 of FIG. 4, a map is accessed that describes a plurality of valid configuration attributes for a storage area network that is coupled with a data center. Referring to FIG. 5, map 522 is accessed to determine the valid configuration attributes for storage area network 504. In one embodiment, the devices in the SAN are identified using world wide name (WWN) addresses. In one embodiment, the valid configuration attributes comprise a listing of WWNs that are communicatively coupled with the communication ports of SAN switches in SAN 504.

With reference to FIG. 5, and to step 620 of FIG. 6, an actual configuration attribute from a device described in the map is received. Referring again to FIG. 5, a WWN-to-port table of a SAN switch is accessed to determine the actual configuration attributes of that switch. The data of the WWN-to-port table is sent to SAN verification program 530 to determine whether the actual configuration attributes of that device are in accordance with the valid configuration attributes for that SAN switch.

With reference to FIG. 5, and to step 630 of FIG. 6, the actual configuration attribute is compared with a corresponding valid configuration attribute from the map. In one embodiment, the WWN of a second network device is searched for in the WWN-to-port table of the SAN switch. If the WWN is found, a comparison is made with the network map (e.g., map 522 of FIG. 5) to determine if the network device identified by that WWN is communicatively coupled with the correct communication port of the SAN switch.

Referring now to FIG. 5 and to step 640 of FIG. 6, a report is generated detailing a result of the comparing of step 630. The SAN verification program 530 generates a report 531 that is comprised of a fail message when an actual configuration attribute is not in accordance the corresponding valid configuration attribute from map 522. The report 531 may further comprise an instruction describing how to change the actual configuration attribute to make it compliant with corresponding attribute from the map when the actual configuration attribute does not match the corresponding attribute from the map. In one embodiment, report 531 is further comprised of a pass message when an actual configuration attribute is in accordance the corresponding valid configuration attribute from map 522.

The preferred embodiment of the present invention, a method for verifying storage area network configuration, is thus described. While the present invention has been described in particular embodiments, it should be appreciated that the present invention should not be construed as limited by such embodiments, but rather construed according to the following claims.

What is claimed is:

1. A method for verifying a storage area network configuration comprising:
   accessing a map that describes a correct configuration attribute for physically cabling a storage area network device to another device over a storage area network fabric cable, said map including configuration attributes for said storage area network device and for said another device, wherein said map includes a source port ID and destination port ID for said storage area network fabric cable physically cabling said storage area network device to said another device;
   requesting an actual configuration attribute from said storage area network device;
   comparing said actual configuration attribute with said correct configuration attribute to verify if said storage area network device is physically cabled to said another device over said storage area network fabric cable; and
   generating a result in response to said comparing, said result comprising an instruction describing how to change physical cabling of said actual configuration attribute to make it compliant with physical cabling of said correct configuration attribute.

2. The method as recited in claim 1, wherein said storage area network device is a storage area network switch and comprising requesting said actual configuration attribute from said storage area network switch.

3. The method as recited in claim 2 further comprising determining the identity of a network device that is coupled with said storage area network switch.

4. The method as recited in claim 3, wherein said determining comprises identifying said storage area network switch and said network device using their respective World Wide Name (WWN) addresses.

5. The method as recited in claim 3 further comprising:
   identifying a communication port on said storage area network switch; and identifying a world wide name (WWN) associated with said network device to which said communication port on said storage area network switch is communicatively coupled.

6. The method as recited in claim 1, wherein said generating comprises generating a pass message when said actual configuration attribute matches said correct configuration attribute.

7. The method as recited in claim 1, wherein said generating comprises automatically generating a fail message when said actual configuration attribute does not match said correct configuration attribute.

8. The method as recited in claim 7, wherein said accessing, said requesting, said comparing, said generating, and said including are performed automatically.

9. The method as recited in claim 1, wherein said storage area network is communicatively coupled with a data center.

10. A data center comprising:
a bus for communicating information;
a processor coupled with said bus for processing said information; and
a computer readable memory coupled with said bus and containing instructions for implementing a method for verifying resource configuration comprising:
accessing a map that describes a valid configuration attribute for physically cabling a storage area network device to another device over a storage area network fabric cable, said map including configuration attributes for said storage area network device and for said another device, wherein said map includes a source port ID and destination port ID for said storage area network fabric cable physically cabling said storage area network device to said another device;
receiving an actual configuration attribute from said storage area network device physically cabled with said data center;
comparing said actual configuration attribute to said corresponding valid configuration attribute described by said map to verify if said storage area network device is physically cabled to said another device over said storage area network fabric cable; and
generating a report describing a result of said comparing, said report comprising an instruction describing how to change physical cabling of said actual configuration attribute to make it compliant with physical cabling of said correct configuration attribute.

11. The data center of claim 10, wherein said actual configuration attribute is received from a storage area network switch.

12. The data center of claim 11, wherein said actual configuration attribute describes a second network device that is communicatively coupled with said storage area network switch.

13. The data center of claim 12, wherein said second network device is identified using a unique world wide name (WWN) address.

14. The data center of claim 10, wherein said report comprises a pass message indicating that said actual configuration attribute matches said corresponding valid configuration attribute.

15. The data center of claim 10, wherein said report comprises a fail message indicating that said actual configuration attribute does not match said corresponding valid configuration attribute.

16. The data center of claim 10, wherein said method for verifying resource configuration is performed automatically.

17. A method for verifying a storage area network configuration comprising:
accessing a map that describes a plurality of valid configuration attributes for physically cabling a storage area network device to another device over a storage area network fabric cable, said map including configuration attributes for said storage area network device and for said another device, wherein said map includes a source port ID and destination port ID for said storage area network fabric cable physically cabling said storage area network device to said another device;
receiving an actual configuration attribute from said storage area network device described in said map;
comparing said actual configuration attribute with said a corresponding valid configuration attribute from said map to verify if said storage area network device is physically cabled to said another device over said storage area network fabric cable; and
generating a report detailing a result of said comparing, said report comprising an instruction describing how to change physical cabling of said actual configuration attribute to make it compliant with physical cabling of said correct configuration attribute.

18. The method as recited in claim 17 further comprising:
contacting a network switch in said storage area network and receiving said actual configuration attribute from said network switch.

19. The method as recited in claim 18 further comprising:
using said actual configuration attribute to identify a communications port on said network switch; and
using said actual configuration attribute to identify a second device of said storage area network that is communicatively coupled with said communications port.

20. The method as recited in claim 19, wherein said network switch and said second network device are separately identified using a unique world wide name (WWN) address.

21. The method as recited in claim 17, wherein said generating comprises generating a pass message when said actual configuration attribute matches said corresponding valid configuration attribute.

22. The method as recited in claim 17, wherein said generating comprises generating a fail message when said actual configuration attribute does not match said corresponding valid configuration attribute.

23. The method as recited in claim 17, wherein said storage area network is communicatively coupled with a data center.

* * * * *